United States Patent Office 3,334,546
Patented Aug. 8, 1967

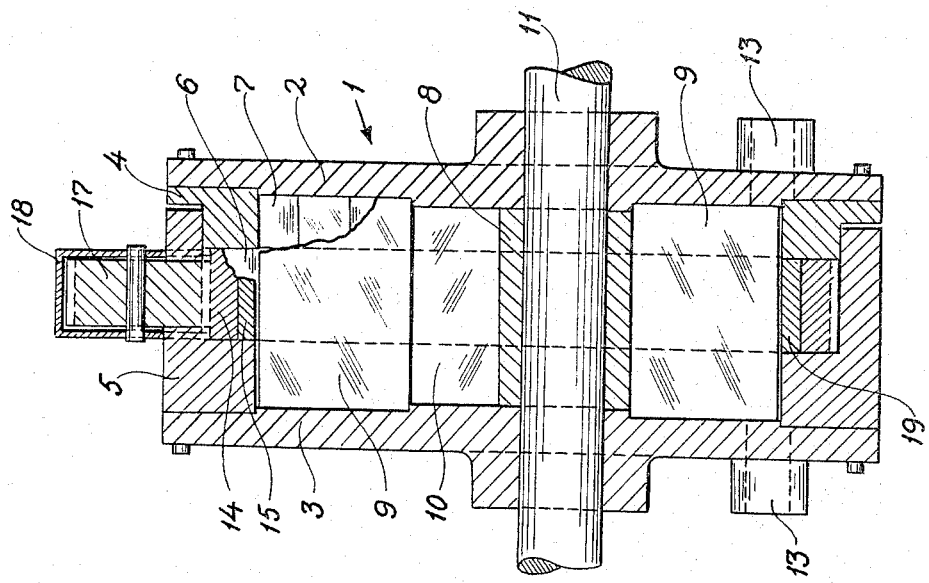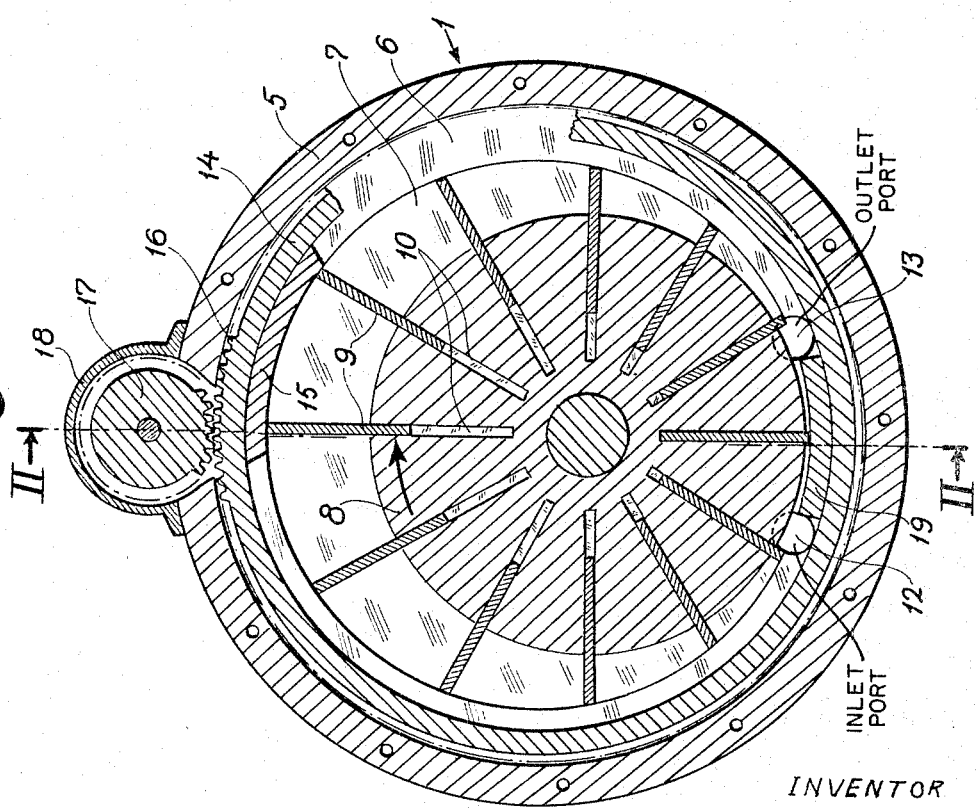

3,334,546
FLUID DRIVE POWER TRANSMISSION
Antti Kustaa Aukusti Vuolle-Apiala, Keuruu, Finland
Filed Nov. 9, 1965, Ser. No. 506,975
2 Claims. (Cl. 91—75)

ABSTRACT OF THE DISCLOSURE

This invention relates to hydraulic motors of the type comprising a rotor having a plurality of vanes and mounted on a shaft eccentrically within a rotor chamber, and means for circulating hydraulic fluid through the rotor chamber The hydraulic motor comprises a housing a cylindrical rotor chamber within said housing, a driven shaft eccentrically journalled in said rotor chamber and extending from at least one end of the housing, a vane type rotor fastened concentrically to and driving said shaft, and a fluid inlet to and a fluid outlet from said rotor chamber, said inlet and outlet being connected to a system for circulating fluid through said rotor chamber. At least one groove extends in the inner surface of the rotor chamber along the free space between said rotor and the periphery of said rotor chamber; a regulating piece is slidably inserted in said groove and blocks it over the distance between at least two adjacent rotor vanes. Means is provided for shifting the position of said regulating piece in said groove for regulating the speed and torque of the hydraulic motor.

---

The invention will be described in the following with reference to an embodiment shown in the accompanying drawing.

In the drawing FIG. 1 is a longitudinal section of a hydraulic motor according to the invention, and FIG. 2 is a cross-section along line II—II of FIG. 1.

Referring to the drawing, 1 designates a cylindrical housing. The housing comprises two end plates 2 and 3 and a mantle fastened between the end plates and consisting of two annular parts 4 and 5 which are substantially L-shaped in cross-section so as to fit tightly together leaving an annular groove 6 in the inner periphery of the mantle. Within the housing 1 a cylindrical rotor chamber 7 is formed. A rotor 8 provided with a plurality of vanes 9 slidably mounted within radial slots 10 is keyed to a shaft 11 which is eccentrically mounted in end plates 2 and 3 of the housing 1. The housing 1 is also provided with inlet ports 12 and outlet ports 13 on both sides of the rotor chamber 7 which points are connected to any convenient means for circulating hydraulic fluid through the rotor chamber.

For regulating the speed and torque of the motor output the invention provides a regulating device. This device comprises an annular member 14 tightly but slidably mounted in the annular groove 6 and having secured thereto a regulating piece 15. The regulating piece 15 is shaped so that its inner surface is flush with the inner periphery of the mantle parts 4 and 5, and in the direction of rotation of the rotor 8 it extends over the distance between the outer ends of two adjacent rotor blades 9. The member 14 and the regulating piece 15 will thus entirely block a portion of the groove 6. For adjustment of the regulating piece 15 the outer periphery of the member 14 is provided with a gear rim 16, and a corresponding rotatable gear 17 is mounted in a housing 18 secured to the outer periphery of the housing 1.

The portion of the groove 6 extending between the inlet and outlet ports 12 and 13 is blocked with a piece 19 secured to either one or both of the mantle parts 4 and 5.

The operation of the above described hydraulic motor is as follows:

Hydraulic fluid pumped by any suitable means is supplied to the inlet 12 and passes through the rotor chamber 7 to the outlet 13. In the rotor chamber 7 hydraulic fluid can flow partly through the annular groove 6 past the vanes 9, but in front of the regulating piece 15 the hydraulic fluid will exert full pressure on the exposed area of the vanes, thus rotating the rotor 8. Depending on the position of the regulating piece 15, the torque and speed of the motor output will vary. The greatest torque and the lowest speed will be provided when the regulating piece is halfway between the inlet 12 and the outlet 13, and by shifting the regulating piece to the right in the drawing the torque will be reduced and the speed increased. Shifting of the regulating piece 15 is obtained by operating the gear 17 in any convenient manner whereby the annular member 14 will be rotated.

By including a reverse valve in the fluid circulating system, the motor may be operated in both directions of rotation.

The invention is not limited to the embodiment shown and described which may be modified in different ways obvious to one skilled in the art. Thus to example it is possible to provide one annular groove and a corresponding regulating piece in the inner surface of each of the end plates of the housing to extend along the free space between the rotor and the periphery of the rotor chamber. It would also be possible to provide the shifting of the regulating piece by hydraulic means instead of the mechanical means in the embodiment shown.

What I claim is:
1. A hydraulic motor comprising a stationary housing, a cylindrical rotor chamber within said housing, a shaft mounted for rotation eccentrically of said chamber and extending from at least one end of the housing, a vane type rotor fastened to said shaft concentrically therewith within said rotor chamber, an inlet for hydraulic fluid to and an outlet for hydraulic fluid from said rotor chamber for connecting it to a hydraulic fluid circulating system, at least one groove in the inner surface of the rotor chamber extending along the free space between said rotor and the periphery of the rotor chamber, a regulating piece slidably received in said groove and spanning the distance between at least two adjacent rotor vanes while leaving a major portion of the length of the groove unobstructed, and means for shifting the position of said regulating piece in said groove for regulating the speed and torque of the power output from said shaft when a constant rate fluid flow is circulated through said inlet and outlet.

2. A hydraulic motor as in claim 1, wherein the motor is reversible, and comprising a fluid reversing valve connected to said inlet and outlet of the rotor chamber and to said hydraulic fluid circulating system.

References Cited

UNITED STATES PATENTS

| 1,482,807 | 2/1924 | Newberg | 103—120 |
| 2,519,523 | 8/1950 | Wenz | 192—58 |
| 2,991,930 | 7/1961 | Lindner | 230—138 |
| 3,133,617 | 5/1964 | Hartmann | 192—58 |
| 3,204,736 | 9/1965 | Trimmer | 192—58 |

MARK NEWMAN, *Primary Examiner.*
ARTHUR T. McKEON, *Examiner.*